Patented Sept. 5, 1944

2,357,756

UNITED STATES PATENT OFFICE 2,357,756

PROCESS OF PREPARING A VITAMIN B COMPLEX CONCENTRATE

Sidney Musher, New York, N. Y., assignor to Musher Foundation Incorporated, New York, N. Y., a corporation of New York No Drawing. Application January 3, 1942, Serial No. 425,517

10 Claims. (Cl. 167—81)

The present application relates to the preparation of water soluble vitamin extracts from cereals, particularly from dry processed corn germ and from oats as well as from legumes such as defatted peanuts and soybeans.

Water soluble cereal extracts present difficult problems due to the presence of bitter water soluble materials, which materials have been found not to comprise the vitamin B complex and which it is the object of the present invention to remove.

Although many attempts have been made to remove protein or protein-like materials, as for example by use of alcohol and other similar water soluble solvents, a completely satisfactory product was not produced.

It has been found that the problem of removing these bitter tasting substances from extracts of cereals involves more than the removal of protein or proteid substances. There are many other complex organic materials which may or may not be of protein nature which have to be removed to give an extract devoid of bitter tasting substances, yet one which will contain a higher yield of the various elements of the vitamin B complex than can be obtained by merely alcohol treatment, alcohol extraction or alcohol purification.

It is an object of the present invention, therefore, to prepare water soluble extracts from cereals, particularly corn germ and oats, high in the vitamin B complex, which extracts are substantially free of bitter flavor, free of insoluble residues, and which comprise all the water soluble members of the vitamin B complex.

A further object is to produce a vitamin B complex product of low cost and great utility, concentrating to a maximum the B complex contained in the original corn germ or oats or other cereal or legume.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the present invention, it has been found that the bitter tasting substances may be removed while at the same time the non-objectionable protein or proteid materials of the substantially entire vitamin B complex are retained by first extracting at a relatively low pH, concentrating, adjusting the extract to a high pH approaching or near neutrality and then subsequently again adjusting the extract to a more acid pH.

For example, in the preferred procedure, the cereal material which may be finely divided oats or corn germ is extracted at a pH of about 4 to 6, is condensed, and is then adjusted to a pH of, say, 6.8 following which it is diluted, filtered, and then again acidified so that it has a pH of between 4 and 6. This concentrated extract will be largely devoid of all bitter tasting substances and will contain substantially the entire B complex with a higher yield than hitherto obtainable by other methods of treatment.

In the preferred procedure, the finely divided cereal material, whether it be corn germ or oats, is processed at a temperature between 100° F. to 150° F. and desirably between 110° F. and 135° F. at a pH of 4.5 to 5.5 following which the filtered extract is concentrated and then is adjusted to a pH close to neutrality.

This concentrated extract with the pH adjusted to neutrality is then diluted and filtered and then again acidified to about pH 5.0 to 6 following which it may again be concentrated.

As an example of the manner in which the procedure of the present application may be carried out, corn germ is removed from the corn by aspirating and without subjecting the corn to any soaking in water, dilute sulfurous acid, or other aqueous medium. Particularly, sulfurous acid treatment must scrupulously be avoided in the preparation of the extract of the present invention.

The corn germ is blown free of bran and other impurities until it contains over 17% and desirably 20% to 22% or more oil content.

The dry milled corn germ thus prepared is then ground to over 25 mesh and desirably to 40 mesh or more and is ready for the first extraction procedure.

One part of this finely divided dry milled corn germ is then added to between 2½ and 4 parts of water by weight, and desirably to 3 parts of water by weight.

The water must be adjusted to a pH of less than 6.0 and not under 4.0 and desirably to between 4.5 and 5.0. A pH of 4.5 has shown the most satisfactory results for the procedure of the present invention. The pH is checked and maintained after the corn germ has been added to the water.

The acidification is made by addition of $H_2SO_4$, HCl or other strong acid. Preferably, a nondistillable acid, such as $H_2SO_4$ is used. For example, in a mixture containing 1000 pounds of dry milled corn germ and 3000 pounds of water having an original pH about 6.8 to 7, about 500 cc. to 750 cc. of $H_2SO_4$ will be sufficiently to acidify the mixture properly. Soft water is used preferably for this extraction procedure.

The corn germ is thoroughly agitated in the acidified water at between about 110° F. and 135° F. and preferably at about 125° F. for a period of from ½ hour to 3 hours and preferably for 1 hour. Lower temperatures or shorter agitation periods will not readily extract all the members of the B complex and therefore these elevated temperatures must be used.

It is important that, at the time the corn germ is added to the water, a water distillable germicide and fungicide be added to the water mix. For example, 0.1% by weight of furfural may be added to the solution and the furfural content is maintained up to the finishing of the extraction procedure.

After the agitation has been completed, the undissolved solids may be removed by centrifuging, filtration, or by pressing out the solids. The wet cake may then be washed with equal parts of warm water to remove any vitamin containing extract still left in the cake.

The water extracted cake is then dried by exposing to a blast of heated air and is then ready to go to the expellers for oil expression. This dried residual cake is even more highly valued than the original unextracted corn germ because of its higher corn oil content.

The substantially sterile, acid-water extract of the finely divided dry milled corn germ is then condensed at a temperature under 145° F. and desirably between 120° F. and 135° F. and under a vacuum of over 20 inches until the extract reaches a Baumé of 30° to 40° and desirably about 38°.

At this Baumé, the extract will contain between about 60% and 65% total solids and is a yellow-greenish cloudy heavy syrup, becoming grainy and plastic on cooling.

To this concentrated extract there is desirably added an additional 0.1% of water distillable fungicide and bactericide such as furfural.

A concentrated lye solution, preferably NaOH, is then prepared, and while agitating furiously, the lye solution is added to the concentrate until a pH of at least 6.8 is reached, and desirably between 6.8 and 7.5. A pH of about 6.9 to 7.2 has shown the most highly satisfactory results for the purposes of the present invention.

Where the pH is held under 6.8, the solids will not be removed in accordance with the purification procedure of the present invention and an extract having inferior and bitter flavor, lower vitamin B complex potency, and high content of objectionable solids is obtained.

The extract is then desirably diluted with sufficient water so that 50% to 100% by weight of water is added against the weight of the concentrated extract.

The alkalinized, diluted extract is then cooled to at least 70° F. to 80° F. This cooling procedure is important since the objectionable solids at this pH appear to remain in solution at a higher temperature and come out when the temperature is lowered.

The cool, alkalinized, diluted extract is then centrifuged or filtered to remove insoluble materials which comprise a large portion of the total solids present in the extract. The solids material on the filter press or centrifuge may be washed with a small amount of water having the same pH as the filtrate or centrifugate.

The clear filtrate or centrifuge is then acidified by addition of $H_2SO_4$ or similar acid to a pH of about 5.0 to 6.0 and preferably to a pH of about 5.0 to 5.5.

This filtrate or centrifugate remains perfectly clear if subjected to temperatures ranging between 40° F. and 212° F. no flocculation whatever appearing at those temperatures even when the extract is boiled.

Where, however, the previous purification of the concentrated extract is made at a pH of under about 6.8, such as at a pH of 5.9 to 6.3 or less, the filtrate or centrifugate shows flocculation when subjected to temperature changes and therefore the purification must be conducted at a pH of over about 6.8 and desirably less than 7.5.

The filtrate or centrifugate prepared in accordance with the procedure outlined herein is then returned to the condenser and condensed under vacuum to a Baumé of between 37° and 41° and to a total solids of about 70% to 75%.

The extract coming from the evaporator will be a substantially clear syrup having a pleasant flavor. Upon standing from 24 to 48 hours, and particularly upon standing at low temperatures of under 70° F., the purified extract may deposit between 5% and 10% of insoluble materials that may develop even though when freshly evaporated the extract is perfectly clear.

These undissolved materials which develop on standing or cooling may be removed by siphoning, centrifuging or filtering after a standing period of 2 to 10 days in a cool place.

The insoluble portion appears to go into solution in the extract when it is heated and is precipitated on cooling so the extract must be kept under cool conditions of not exceeding 70° to 80° F. during the final filtration or centrifuging just as is required during the first purification procedure.

Where the insoluble matter as a result of settling out has reduced the total solids to under 70%, the supernatant clear portion or filtrate or centrifugate may be returned to the vacuum evaporator to bring the total solids back to about 70% to 73%.

The pH of the final product is desirably between 5.2 and 5.4 and may be adjusted thereto.

In the process of the present invention, saccharification, malting or fermentation is scrupulously avoided as otherwise, the highly potent good flavored extract desired is not obtained.

In connection with all the acidifying procedures, care must be exercised not to permit the use of sulfurous acid or any sulfite material as the entire procedures of the present invention would be upset and complete loss of the vitamin B would result.

By the use of a germicide and fungicide, solubilization of both starch and proteins is prevented and the extracts obtained are therefore substantially free of solubilized starch, amine acids and other decomposition products.

Of the utmost importance in accordance with the present invention is that the ranges of pH and temperature be maintained. In the purification procedure, the pH range as indicated is 6.8 to 7.5 and the product must be cool while filtering at the pH of 6.8 to 7.5 as the insoluble materials are only precipitated to the desired extent when the extract is at a low temperature.

Less desirably, the final extract thus obtained may be applied to a carrier, such as to starch, salt, sugar, dried milk, etc. and given a final vacuum drying or the extract itself may be dried under reduced pressure.

The final extract may also be combined with cane or beet molasses and the vitamin B content of the B complex of the present extract is found to be substantially stable when combined in moderate proportions such as in amounts of from 30% to 60% with molasses, preferably cane sugar molasses.

The present procedures may also be applied to the preparation of the vitamin B complex from oats and particularly from ground oats containing oat hulls and other oat constituents.

Whereas in the case of the corn germ extract the final concentrated extract is in substantially syrup condition, the oat extract when the procedures described above are followed is a substantially plastic product and one which is perfectly smooth, water soluble and which does not separate out into crystals or grainy materials upon standing.

Pulverized whole oats containing the normal content of oat hulls, oat bran and other oat constituents may similarly be extracted under the temperature and pH conditions described above.

Less preferably, other cereal grains may be treated in the foregoing manner and include particularly rice bran, rice polishings, wheat germ, hominy feed and corn flour as well as the legume flours such as defatted peanut flour, soybean flour, etc.

In any event, these cereals or legume flours must be prepared without having been subjected to any wet milling operation such as to a sulfurous acid treatment but must be free of any previous aqueous treatment until ready for extraction and purification in accordance with the procedures of the present invention.

The final condensed extract may, where desired, be heated to 150° F. to 200° F. with the addition of 0.5% to 1.5% of HCl, $H_2SO_4$ or similar acid for a period of from 10 to 30 minutes.

The essential feature of the extraction procedure of the present invention resides in first extracting the finely divided cereal material such as corn germ or whole oats cereal with a substantially acid aqueous extracting medium followed by condensation of the extract and adjustment to the pH of or near neutrality with an alkaline metal compound such as sodium hydroxide. After the initial extraction, adjustment of the pH and following condensation, the product is filtered although in order to filter the concentrated product it may be diluted after its pH has been adjusted.

Having described my invention, what I claim is:

1. The process of preparing a vitamin B complex concentrate which comprises extracting dry processed finely divided corn germ having over 17% oil content with water containing a bactericide at between 110° F. and 135° F., at a pH of 4.0 to 6.0, removing the undissolved solids, condensing the soluble portion to over 30° Baumé, adjusting the concentrate by adding caustic alkali to a pH of between 6.8 and 7.5 without heating, diluting with water to obtain fluidity, removing the undissolved solids while cool, adjusting the pH of the soluble portion to 5.0 to 6.0, and then concentrating the purified extract.

2. The process of preparing a vitamin B complex concentrate which comprises extracting dry processed finely divided corn germ having over 17% oil content with water containing a water distillable bactericide at 125° F. and at a pH of 4.5 for one hour, removing the undissolved solids, condensing the soluble portion to 38° Baumé, adjusting the concentrate by adding caustic alkali to pH 7.2, diluting with water to obtain fluidity, removing the undissolved solids while cool, adjusting the pH of the soluble portion to 5.4 and then concentrating the purified extract.

3. The process of preparing a vitamin B complex concentrate which comprises extracting a dry processed finely divided oat cereal with water containing a bactericide at between 110° F. and 135° F., at a pH of 4.0 to 6.0, removing the undissolved solids, condensing the soluble portion to over 30° Baumé, adjusting the concentrate by adding caustic alkali to a pH of between 6.8 and 7.5 without heating, diluting with water to obtain fluidity, removing the undissolved solids while cool, adjusting the pH of the soluble portion to about 5.0 to 6.0, and then concentrating the purified extract.

4. The process of preparing a vitamin B complex concentrate which comprises extracting a dry processed finely divided cereal with water containing a bactericide at between 110° F. and 135° F. at a pH of 4.0 to 6.0, removing the undissolved solids, condensing the soluble portion to over 30° Baumé, adjusting the concentrate by adding caustic alkali to a pH of between 6.8 and 7.5 without heating, diluting with water to obtain fluidity, removing the undissolved solids while cool, adjusting the pH of the soluble portion to 5.0 to 6.0 and then concentrating the purified extract.

5. The process of preparing a vitamin B complex concentrate which comprises extracting a finely divided material selected from the group consisting of the cereals and legumes with an aqueous acidified solvent having a slightly acid pH at a temperature of between 110° F. and 135° F., removing the undissolved solids, concentrating the soluble portion, adjusting the pH of the concentrate with an alkaline metal compound to a pH between 6.8 and 7.5 diluting to obtain fluidity, removing the undissolved precipitated material and then again acidifying and concentrating.

6. The process of preparing a vitamin B complex concentrate from cereals which comprises extracting a finely divided cereal with an aqueous acidified solvent having a pH of between 4.0 and 6.0 at a temperature of between 110° F. and 135° F., removing the undissolved solids, concentrating the soluble portion, adjusting the pH of the concentrate with an alkaline metal compound to a pH between 6.8 and 7.5 diluting to obtain fluidity, removing the undissolved precipitated material and then again acidifying and concentrating.

7. The process of preparing a vitamin B complex concentrate from a whole oat cereal which comprises extracting the whole oat cereal with an aqueous acidified solvent having a pH of between 4.0 and 6.0 at a temperature of between 110° F. and 135° F., removing the undissolved solids, concentrating the soluble portion, adjusting the pH of the concentrate with an alkaline metal compound to a pH between 6.8 and 7.5 diluting to obtain fluidity, removing the undissolved precipitated material and then again acidifying and concentrating.

8. The process of preparing a vitamin B complex concentrate which comprises extracting an oat cereal with water at a pH between 4.0 and 6.0, removing the undissolved solids, concentrating the soluble extract to at least about 30° Baumé, adjusting the pH of the concentrated extract to between pH 6.8 and 7.5 by adding an alkaline metal compound, diluting with water to obtain fluidity, removing the undissolved solids, adjusting the pH of the soluble fraction to between pH 4.0 and 6.0 by addition of acid, and then concentrating the purified extract.

9. The process of preparing a vitamin B complex concentrate which comprises extracting a corn cereal with water at a pH between 4.0 and 6.0, removing the undissolved solids, concentrating the soluble extract to at least about 30° Baumé, adjusting the pH of the concentrated extract to between pH 6.8 and 7.5 by adding an alkaline metal compound, diluting with water to obtain fluidity, removing the undissolved solids, adjusting the pH of the soluble fraction to between pH 4.0 and 6.0 by addition of acid, and then concentrating the purified extract.

10. The process of preparing a vitamin B complex concentrate which comprises extracting a finely divided cereal with an aqueous acidified solvent having a slightly acid pH at a temperature of between 100° F. and 150° F., removing the undissolved solids, concentrating the soluble portion, adjusting the pH of the concentrate with an alkaline metal compound to a pH between 6.8 and 7.5, diluting to obtain fluidity, removing the undissolved precipitated material, and then again acidifying and concentrating.

SIDNEY MUSHER.